United States Patent [19]

Walters, Jr. et al.

[11] 4,152,402
[45] May 1, 1979

[54] PARTIAL PURIFICATION OF WET-PROCESS PHOSPHORIC ACID WITH ACETONE AND AMMONIA

[75] Inventors: Henry K. Walters, Jr.; Yong K. Kim; John D. Hatfield, all of Florence, Ala.

[73] Assignee: Tennessee Valley Authority, Muscle Shoals, Ala.

[21] Appl. No.: 881,087

[22] Filed: Feb. 24, 1978

Related U.S. Application Data

[63] Continuation-in-part of Ser. No. 608,834, Aug. 29, 1975, now Defensive Publication No. T952,002.

[51] Int. Cl.² ............... C01B 25/22; C01B 25/28
[52] U.S. Cl. ..................... 423/321 S; 423/310; 423/313; 71/35
[58] Field of Search ........... 423/321 S, 312, 313; 71/35, 34

[56] References Cited

U.S. PATENT DOCUMENTS

3,764,657  10/1973  Frankenfeld et al. ............ 423/321 S
3,894,143  7/1975  Von Semel et al. ............... 423/321 S

OTHER PUBLICATIONS

Kim et al., J. Agr. Food Chem., vol. 22, No. 6, 1974, pp. 1099–1106.

Primary Examiner—O. R. Vertiz
Assistant Examiner—Thomas W. Roy
Attorney, Agent, or Firm—Robert A. Petrusek

[57] ABSTRACT

An improved process for the purification of wet-process phosphoric acid (WPPA) with acetone and ammonia. The main product is the purified acid and a by-product is the impure acid fraction in a liquid form containing most of the impurities including the added ammonia. The WPPA is mixed with acetone and the specified amount of ammonia to form two liquid phases that separate rapidly. The top layer contains about 75 percent of the phosphoric acid, nearly all the acetone, and a small fraction of the impurities. The bottom liquid layer has a viscosity usually in the range of 40 to 2500 centipoises, depending on the acid concentration and the amount of ammonia used. The acetone is distilled from the two liquid phases for recycle to the process.

8 Claims, 2 Drawing Figures

PARTIAL PURIFICATION OF WET-PROCESS PHOSPHORIC ACID WITH ACETONE AND AMMONIA

The invention herein described may be manufactured and used by or for the Government for governmental purposes without the payment to us of any royalty therefor.

This application is a continuation-in-part of application Ser. No. 608,834, filed Aug. 29, 1975, now Defensive Publication No. T952,002, published Nov. 2, 1976, for PARTIAL PURIFICATION OF WET-PROCESS PHOSPHORIC ACID WITH ACETONE AND AMMONIA.

FIELD OF THE INVENTION

The present invention is an improved process for the purification of wet-process phosphoric acid (hereinafter referred to, for convenience, as WPPA) wherein partially ammoniated WPPA is mixed with acetone to separate most of the metallic and anionic impurities in an easily and rapidly separable bottom liquid layer and the purified acid in the top layer.

DESCRIPTION OF THE PRIOR ART

In the present specification, phosphoric acid prepared by treating a phosphate rock with mineral acids such as sulfuric acid, hydrochloric acid, and the like, is referred to as wet-process phosphoric acid (WPPA). Such WPPA contains impurities such as Fe, Al, Mg, U, F, and the like, together with organic materials which were leached from the phosphate rock. These impurities cause many difficulties when the WPPA is used to prepare industrial products such as fertilizer solutions, chemicals, foods and the like. As a result, the utility of WPPA has been severely limited in many commercial processes. Consequently, it is desirable to remove all of the impurities, or at least most of them, to make the WPPA suitable for use in the manufacture of many phosphate products.

In the prior art, purification methods are known for extracting WPPA with organic solvents which dissolve phosphoric acid and distribute most of the impurities in a separate liquid phase or a separate solid phase. These organic solvents are generally classified as water miscible and water immiscible.

The water-immiscible organic solvents such as alcohols, e.g., isobutanol, n-butanol, heptyl; ethers, e.g., isopropyl; ketones, e.g. methylisobutyl ketone, all selectively extract phosphoric acid and distribute most of the contained impurities into a separate aqueous phase. Thereafter, in several washing steps, water is used to remove the purified acid from the organic solvent. However, several disadvantages are noted in extracting phosphoric acid with water-immiscible solvents. For example, solvent loss is usually high because of some solubility in water which requires expensive recovery procedures. Also, the slow and incomplete coalescence of the separate liquid phases often slows the rate of the extraction step and leads to additional solvent loss.

In the case of water-miscible solvents, such as ethyl alcohol, methyl alcohol, isopropanol and acetone, prior-art methods are also known that extract phosphoric acid from crude WPPA. Some of these methods require the addition of an alkali or alkali salt. However, in the prior art described infra, the impurities contained in the WPPA are deposited either as a fine flocculent precipitate or as a viscous, gummy or waxy precipitate. These solids are then removed from the mixture of solvent and phosphoric acid by filtration or centrifugation before fractional distillation of the solvent from the purified acid. The properties of these solids and the tedious methods for their removal have restricted the development of purification processes using water-miscible solvents.

A process for purification of WPPA with water-miscible organic solvents in the presence of alkali compounds is described in British Pat. No. 464,370 and in German Pat. No. 648,295. This process depends on the treatment of WPPA with solvents such as methyl and ethyl alcohol and acetone in the presence of alkali or ammonia compounds to precipitate most of the impurities. Although the process claims excellent purification of the acid, it has not been used on an industrial scale. The weakness of the process lies in the physical properties of the impure phase which is described as a slimy, viscous mass which is slowly deposited or precipitated. Separation of such a material from the solvent acid solution is very difficult and therefore impractical for an industrial process. The processes described in German Pat. No. 2,050,008 and U.S. Pat. No. 3,764,657 consist of treating WPPA with a water-miscible solvent, isopropanol, and ammonia at the rate of 0.06 to 0.12 mole per mole of $P_2O_5$ to precipitate most of the impurities as an easily filtered solid. Also, German Pat. No. 2,101,759 reveals a method for removal of impurities in solid form by the use of alcohols and ketones. In U.S. Pat. No. 3,975,178 methyl alcohol and ammonia are used to precipitate the impurities at an elevated temperature during about a one-hour reaction period. The precipitated solids are removed by filtration. The process described by Klaus Beltz et al. in U.S. Pat. No. 3,862,298 uses aliphatic alcohols and ketones such as methanol, ethanol, propanol, isopropanol, and acetone, without ammonia addition, to separate out in the form of a salt the impurities contained in phosphoric or sulfuric acids. The impurities are precipitated as a cation-containing solids fraction that are finally removed by filtration techniques. In a similar process, Von Semel et al. (U.S. Pat. No. 3,894,143) uses water-miscible solvents, mainly acetone, to prepare purified ammonium phosphate crystals by precipitation from previously partially purified WPPA. Obviously, none of these known processes have observed the desirable liquid phase separation found in the process of the instant invention.

OBJECTS OF THE INVENTION

It is an object of the present invention to provide an improved process for the partial purification of WPPA by solvent extraction with acetone and ammonia.

A particular object of the present invention is to provide a process for the removal of the major impurities and the trace elements such as uranium, manganese, cadmium, etc., from WPPA in a rapidly settling liquid phase, thus allowing clean and rapid operation of the process.

Another object of the present invention is to remove the impure fraction of the phosphate in a form suitable for use in fertilizer manufacture with a minimum of processing steps. The impure liquid layer is especially suitable for direct heating at atmospheric pressure or in a vacuum evaporator for recovery of its small acetone content. Also, if preferred, the impure liquid may be ammoniated, thus using the heat of neutralization to evaporate the acetone. In either case, the impure residue is suitable for fertilizer manufacture.

Still another object of the present invention is to pre-concentrate the uranium and other valuable trace elements contained in the WPPA into the bottom impure liquid layer thereby making it amenable for recovery by another solvent extraction process.

An important advantage of the present invention is that acetone is readily and completely recovered from the acetone-acid solution by distillation since acetone has a low boiling point, a low heat of vaporization, and the fact that it does not form a constant boiling mixture with water or with phosphoric acid.

Another advantage of the present invention is that ammonium compounds are economical and the nitrogen values are all recovered as plant nutrients in the final fertilizer products.

A further advantage of the present invention is the rate of the extraction step. The very rapid rate of separation of the two liquid phases greatly facilitates the operation of the purification process and minimizes the size of mixing and separation vessels.

DESCRIPTION OF THE PRESENT INVENTION

In the present invention, an investigation was made of the phenomenon of separation of impurities when WPPA is treated with water-miscible solvents in the presence of ammonia. We have discovered in the use of acetone, with the proper concentration of ammonia, the novel feature of impurity separation in the form of a liquid that is immiscible with the acetone-phosphoric acid mixture. Rapid and complete separation of the impure liquid phase from the lower density solution of purified acid and acetone is observed. Also, we have discovered that the viscosity and consequently the handling properties of the impure liquid phase are determined by the degree of ammoniation and the concentration of the WPPA. The weight ratio of acetone to WPPA has no significant effect on the viscosity.

Acetone alone does not give sufficient purification of the WPPA nor does it provide acceptable physical properties for the impure bottom layer. However, in the present invention, when ammonia ions are present in the specified concentration range, most of the acid is recovered in the top clear layer and most of the impurities are collected in the bottom liquid layer that has desirable properties for a rapid efficient process for purifying WPPA.

The source of ammonium ions can be any ammonium compound that is soluble in WPPA; however, anhydrous ammonia is preferred because no contaminating anions are introduced and the ammonia can be conveniently metered into the acid prior to or during its mixing with the acetone.

The degree of purification increases with an increase in both acetone and ammonia. However, the effectiveness of additional acetone and ammonia becomes progressively less as the degree of purification approaches 100 percent. It is desirable, however, to use the least amount of acetone that gives the desired purification and rapid liquid phase separation, because the most costly step of the process is the distillation of the acetone from the purified acid. The use of a large amount of ammonia is also undesirable because it decreases the recovery of purified acid. It was found that the optimum ranges of ammonia and acetone to give good purification and acceptable viscosity of the impure phase are from about 0.2 to 0.6 mole of ammonia per mole of $P_2O_5$ in the WPPA and from one to about 5 pounds of acetone per pound of WPPA.

The fraction of the $P_2O_5$ recovered as purified acid increases when the amount of acetone used and the $P_2O_5$ concentration in the WPPA increase, but decreases when the degree of ammoniation increases. Within the optimum ranges of acetone and ammonia specified above, about 60 to 85 percent of the $P_2O_5$ is recovered in the purified acid and the remainder as an impure phosphate. The fraction of the purified $P_2O_5$ is increased substantially by recycling part of the impure phosphate layer to the extraction step. Prior to recycling, adjustment of the ammonia content to the specified range is necessary and is easily accomplished by mixing with raw unpurified WPPA.

WPPA containing $P_2O_5$ ranging from about 25 to about 55 weight percent is easily purified in our improved process. Either continuous or batch operation is employed. In either operation, only about 3 minutes of mixing of the acetone with the acid and ammonia are required. The very rapid separation of the two liquid phases is a particularly attractive feature of the instant process and eliminates the problem of slow coalescence of the liquid phases found in nearly all prior-art solvent extraction purification processes. Only about one minute is usually required for a clean separation of the two liquid phases with no entrainment of solid impurities in the acetone phase containing the purified acid fraction. The impure phase bottom liquid settles so rapidly that we have found it necessary to provide a bottom drain in the mixer as only part of the impure phase is carried in the overflow to the settler.

The present invention, together with further objects and advantages thereof will be better understood from a consideration of the following description taken in connection with the accompanying drawings in which.

Figure 1:
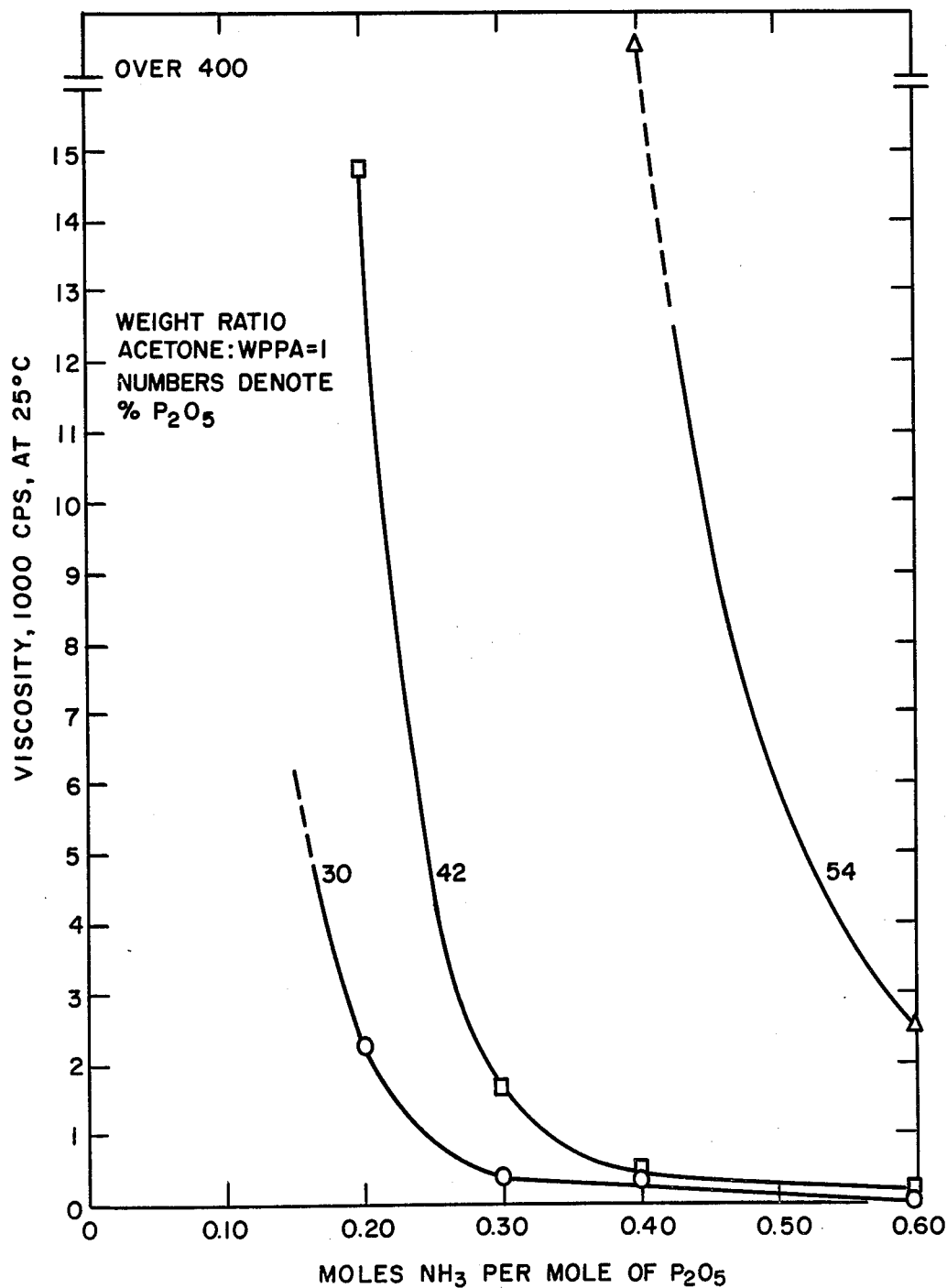
FIG. 1 represents a plot of viscosity vs. degrees of ammoniation of WPPA.

Referring now more specifically to FIG. 1, the effect on viscosities for varying degrees of ammoniation of WPPA is shown. As may be seen, for ammonia addition levels much below our specified range of about 0.2 to about 0.6 mole of ammonia per mole of $P_2O_5$, the impure fraction or precipitated phase exhibits the properties of a solid in that it does not flow as the desirable liquid phase we readily attain when the process is operated within the parameters specified in the present invention as operable.

Further evidence of the effects of ammonia addition on the viscosities of the impure phases at 25° C. obtained by acetone extraction of three WPPA concentrations is shown in the following tabulation:

| WPPA Conc., % $P_2O_5$ | Precipitated Phase | Liquid phase Viscosity, Centipoises [Moles $NH_3$ per mole $P_2O_5$] | | | |
| --- | --- | --- | --- | --- | --- |
| | 0.1 | 0.2 | 0.3 | 0.4 | 0.6 |
| 30 | No flow | 2236 | 324[a] | 364[a] | 42 |
| 42 | No flow | 14,776 | 1628 | 495 | 140 |
| 54 | No flow | No flow | >400,000 | >400,000 | 2516 |

[a]Viscosity measurements erratic due to acetone evaporation; values probably in the range 300–400 cps.

Figure 2:
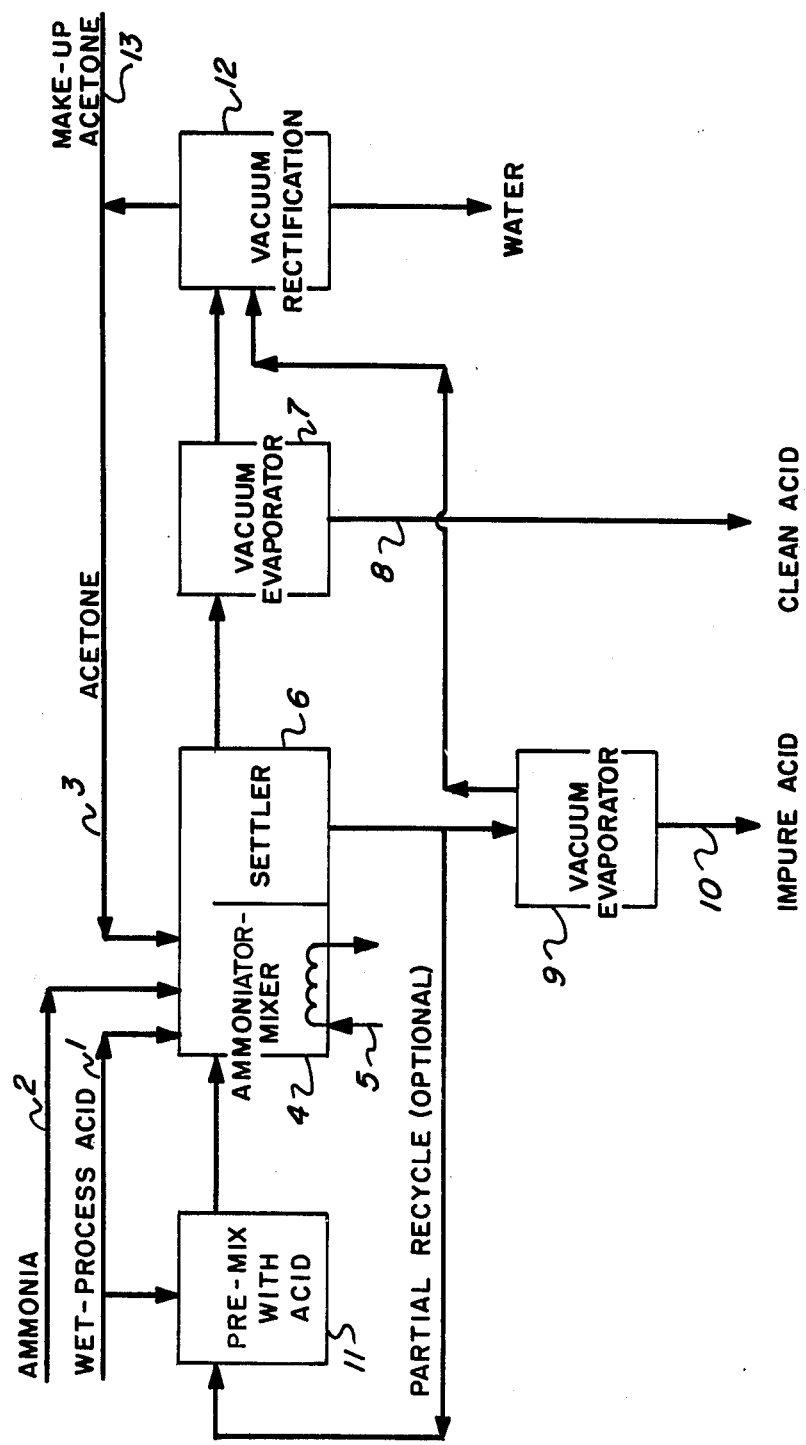
FIG. 2 represents a flowsheet in box form illustrating the preferred embodiments of the present invention.

Referring now more specifically to FIG. 2, therein is illustrated a preferred embodiment of the process of the present invention. WPPA containing about 25 to 55 percent by weight of $P_2O_5$, ammonia, and acetone are metered continuously via lines 1, 2, and 3, respectively, into enclosed and stirred ammoniator-mixer 4. The acid and ammonia flow rates are maintained to provide a mole ratio $NH_3:P_2O_5$ at a fixed value within the range from about 0.2 to 0.6. The acetone is metered continuously into mixer 4 at a flow rate to give a weight ratio of acetone to WPPA from 1 to about 3. The temperature in mixer 4 is maintained by cooling coil 5 in the range of about 25° C. to about the boiling point of the mixture, preferably at about 35° C.

After a retention time in mixer 4 from about 2 to 10 minutes, the resulting acid, ammonia, and acetone mixture is delivered to settler 6 wherein a retention time of about 1 to 10 minutes for separation of the acetone phase and the impure phase is maintained. The acetone phase containing the purified acid overflows to vacuum evaporator 7, wherein all the acetone and part of the water are removed from the purified acid that flows via line 8 to storage. The $P_2O_5$ content of the final purified acid is generally in the range of 55 to 75 percent by weight depending on the concentration desired. The underflow containing the impure acid fraction, along with some water and acetone, is delivered from settler 6 to vacuum evaporator 9. All the acetone and part of the water are removed from the byproduct impure acid that is delivered via line 10 to storage or to further processing in fertilizer manufacture. An optional procedure in handling the impure phase provides that a fraction of it is recycled to the mixer for further extraction of the phosphate with acetone. The recycled fraction is delivered to premixer 11 where raw acid is introduced to adjust the $NH_3:P_2O_5$ mole ratio to the value desired in main ammoniator-mixer 4. This option permits an increased yield of the $P_2O_5$ in the purified acid.

The acetone and water vapors removed from evaporators 7 and 9 are delivered to rectification column 12, from which acetone is recycled to mixer 4. Makeup acetone to adjust for any lost in the purification procedure is added via line 13 to storage.

In order that those skilled in the art may better understand how the present invention can be practiced, the following examples are given by way of illustration but not necessarily by way of limitation.

EXAMPLE I

Merchant-grade WPPA containing 54.1 percent by weight of $P_2O_5$ and having the following amounts of impurities was used in this example:

| Weight percent | | | | |
|---|---|---|---|---|
| Fe | Al | Mg | F | S |
| 0.67 | 0.25 | 0.52 | 0.28 | 0.77 |

One kilogram of the acid was reacted with 26.8 grams of anhydrous ammonia to form an ammoniated feed stock solution containing 53.1 percent $P_2O_5$ and having a mole ratio $NH_3:P_2O_5$ of 0.40. Ammoniated acid, 18.1 grams per minute, and acetone, 34.3 grams per minute were continuously metered into an enclosed and stirred extractor for 30 minutes. The temperature of the mixture was maintained at 35° C. and the retention time in the extractor (mixer) was 4 minutes. The overflow rate was 44.5 grams per minute and contained 69 percent of the $P_2O_5$ in the feed acid and over 99 percent of the acetone. The overflow was introduced to an evaporator where the acetone was recovered by distillation. The purified acid had the following composition:

| | | Weight percent | | | | |
|---|---|---|---|---|---|---|
| $P_2O_5$ | Fe | Al | Mg | F | S | N |
| 59.2 | 0.008 | 0.005 | 0.05 | 0.10 | 0.11 | 0.54 |

The impure phosphate underflow was continuously drained from the extractor-mixer as a liquid phase. It contained 31 percent of the $P_2O_5$ in the feed acid. The byproduct impure phosphate was ammoniated with anhydrous ammonia and the acetone was recovered by evaporation. The ammoniated product was dried at 70° C., crushed, and screened to minus 8 plus 12 mesh; its composition was as follows:

| | | Weight percent | | | | |
|---|---|---|---|---|---|---|
| $P_2O_5$ | Fe | Al | Mg | F | S | N |
| 45.0 | 1.79 | 0.69 | 1.33 | 0.62 | 1.86 | 17.0 |

About 82 percent of the $P_2O_5$ was water soluble and 100 percent was available by official AOAC procedures; hence, the byproduct is a good fertilizer material, 17-45-0 grade.

EXAMPLE II

Tests were made to determine the effects of recycling 50 percent of the impure phase on the purification and the recovery of the phosphate from a partially ammoniated WPPA made from Florida phosphate rock. A 100-gram batch of the ammoniated acid containing 42.6 percent $P_2O_5$ was extracted with 200 grams of acetone at about 30° C. for 3 minutes and then settled for 3 minutes before separating the impure liquid phase from the acetone phase containing the purified acid. In subsequent extractions, 50 percent of the impure phase from the previous extraction was included as part of the acid mixture for purification. Five more batch extractions were made of mixtures composed of impure phases, the partially ammoniated acid and sufficient amounts of the initial unammoniated acid to adjust the mole ratio $NH_3:P_2O_5$ to 0.34. The amounts of $P_2O_5$ and impurities present in each extraction were calculated from the weights and analyses of each portion of the mixture. In each extraction 2 grams of acetone were used per gram of acid with 3-minute mixing and settling periods. Analyses of the impure acids used and the average analyses of the purified acids and the impure phosphates for the six steps of the test are given in the following tabulation:

| | Weight percent | | | | | | |
|---|---|---|---|---|---|---|---|
| | $P_2O_5$ | Fe | Al | Mg | F | S | N |
| Initial acid | 43.6 | 0.66 | 0.35 | 0.09 | 0.22 | 0.95 | — |
| Ammoniated acid | 42.6 | 0.66 | 0.34 | 0.09 | 0.20 | 0.94 | 1.26 |
| Purified acid | 54.3 | 0.11 | 0.04 | 0.02 | 0.10 | 0.52 | 0.20 |
| Impure phosphate | 39.7 | 3.21 | 1.74 | 0.42 | 0.80 | 3.32 | 4.93 |

The average recovery of phosphate in the purified acid was 84.1 percent during the five recycle steps.

EXAMPLE III

WPPA containing 29.3 percent by weight of $P_2O_5$ and having the following amounts of impurities was used in this example:

| Weight percent | | | | | |
|---|---|---|---|---|---|
| $P_2O_5$ | Fe | Al | Mg | F | S |
| 29.3 | 0.46 | 0.15 | 0.28 | 0.17 | 0.41 |

The acid was reacted with anhydrous ammonia to prepare a partially ammoniated feed stock solution having a mole ratio $NH_3:P_2O_5$ of 0.38. Then 17.3 grams per minute of the ammoniated acid and 34.5 grams per minute of acetone were continuously metered into the stirred extractor. The temperature of the mixture was kept at 28° C. with a retention time of 3 minutes in the mixer-extractor. The overflow from the mixer contained 74.6 percent of the $P_2O_5$ in the feed acid and over 99 percent of the acetone. The rate of overflow was 48.2 grams per minute and the purified acid was obtained after evaporation of all of the acetone and part of the water. The underflow from the mixer-extractor was continuously drained at the rate of 3.6 grams per minute and the impure phosphate material was obtained after evaporation of the acetone and a small amount of water. The purified acid and impure phosphate had the following composition:

| | Weight percent | | | | | |
|---|---|---|---|---|---|---|
| | $P_2O_5$ | Fe | Al | Mg | S | F | N |
| Purified acid | 54.0 | 0.06 | 0.04 | 0.06 | 0.17 | 0.17 | 0.72 |
| Impure phosphate | 37.7 | 2.17 | 0.69 | 1.30 | 1.70 | 0.52 | 4.15 |

EXAMPLE IV

WPPA containing 54.1 percent by weight $P_2O_5$ and the following amounts of impurities was used in this example:

| Weight percent | | | | | |
|---|---|---|---|---|---|
| $P_2O_5$ | Fe | Al | Mg | F | S |
| 54.1 | 0.84 | 0.24 | 0.53 | 0.30 | 0.76 |

Continuous extraction of the acid was accomplished by metering simultaneously 43 grams per minute of WPPA, 1.2 grams per minute of anhydrous ammonia and 31 grams per minute of acetone into the ammoniator-mixer. The temperature of the mixture was kept at 38° C. and the retention time was 4 minutes. This proportion of input materials maintained the weight ratio acetone to WPPA at 0.71 and a mole ratio $NH_3:P_2O_5$ at 0.42. The overflow contained 70 percent of the $P_2O_5$ in the feed acid and about 99 percent of the acetone. The overflow rate was 60.2 grams per minute and the underflow rate was 15 grams per minute. The purified acid and impure phosphate byproduct were obtained after evaporation of the acetone and part of the water.

These compositions were as follows:

| | Weight percent | | | | | | |
|---|---|---|---|---|---|---|---|
| | $P_2O_5$ | Fe | Al | Mg | S | F | N |
| Purified acid | 53.3 | 0.11 | 0.03 | 0.16 | 0.21 | 0.11 | 1.00 |
| Impure phosphate | 50.9 | 2.38 | 0.65 | 1.30 | 1.98 | 0.80 | 4.867 |

EXAMPLE V

WPPA made from Florida phosphate rock was partially ammoniated with gaseous ammonia to a mole ratio $NH_3:P_2O_5$ of 0.40. In a batch extraction, 200 grams of acid was mixed with 200 grams of acetone for one minute at 35° C. and then allowed to settle for one minute. The bottom liquid layer contained most of the tract elements initially in the crude acid such as uranium, manganese, etc. The top acetone layer contained 76.6 percent of the initial $P_2O_5$. The compositions of the initial crude acid, the impure phosphate fraction, and the purified acid are given in the following tabulation:

| | Percent | Parts per million | | | | | |
|---|---|---|---|---|---|---|---|
| | $P_2O_5$ | U | V | Cd | Cr | Mn | Ni |
| Crude acid | 54.7 | 153 | 189 | 12 | 120 | 306 | 42 |
| Purified acid | 54.7 | 15 | 25 | 2 | 12 | 49 | 3 |
| Impure phosphate | 45.6 | 504 | 605 | 37 | 393 | 952 | 140 |

The liquid impure phosphate byproduct may be utilized for the recovery of the concentrated valuable uranium or other metals by a commercial liquid-liquid extraction process. The final residue is a good fertilizer material.

EXAMPLE VI

A filter grade WPPA containing 31.7 percent $P_2O_5$ was partially ammoniated with gaseous ammonia to a mole ratio $NH_3:P_2O_5$ of 0.20. In a batch extraction 100 grams of acid was mixed with 200 grams of acetone at 30° C. for 5 minutes and then allowed to settle for one minute. The impurity contents of the initial acid and purified acid were as follows:

| | g per Kilogram of $P_2O_5$ | | | | |
|---|---|---|---|---|---|
| | Fe | al | Mg | S | N |
| Initial acid | 17.5 | 6.3 | 10.2 | 13.6 | 20.6 |
| Purified acid | 2.8 | 1.0 | 1.8 | 4.8 | 8.2 |

EXAMPLE VII

WPPA with the following analysis was used in this example:

| Weight percent | | | | | |
|---|---|---|---|---|---|
| $P_2O_5$ | $Fe_2O_3$ | $Al_2O_3$ | MgO | $SO_3$ | F |
| 42 | 0.91 | 0.64 | 0.14 | 2.28 | 0.21 |

$NH_3$ was added to give 0.12 mole of $NH_3$ per mole of $P_2O_5$; 200 grams of this acid was mixed for 3 minutes with 200 grams of acetone at a maximum temperature of 50° C. The impure phase obtained was a gummy nonflowable precipitate. No analysis was obtained because of the undesirable properties.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. An improved process for the partial purification of crude wet-process phosphoric acid containing about 25 percent to about 55 percent by weight $P_2O_5$ which comprises:
   1. mixing said crude acid with acetone and ammonia, while maintaining same at a temperature in the range from about 25° C. to about the boiling point of the solution for a period of time ranging from 2 minutes to 10 minutes, wherein for each mole of $P_2O_5$ in the crude acid, the amount of ammonia is in the range of 0.2 to 0.6 moles, and the amount of acetone is in the range from 1 to 5 pounds for each pound of crude acid;

2. subsequently allowing, during a period ranging from about 1 to about 10 minutes, the resulting mixture of step 1 supra to settle into two separate liquid layers, one being vertically disposed over the other, wherein the upper layer contains purified acid in acetone and wherein the bottom layer having a viscosity at 25° C. in the range of 40 to 5000 centipoises contains a substantial portion of the impurities originally contained in the crude wet-process phosphoric acid;

3. separating the two liquid layers formed in step 2, supra;

4. distilling all the acetone and part of the water from the upper layer solution to obtain partially purified acid as a product; and 5. distilling all the acetone and part of the water from the bottom liquid layer to recover the impure acid fraction and concomitant valuable impurities.

2. The process of claim 1 wherein the bottom impure liquid layer is derived from a filter grade WPPA containing about 30 percent $P_2O_5$; wherein the moles of ammonia per mole of $P_2O_5$ is maintained in the range from about 0.2 to about 0.6, and wherein the resulting bottom liquid layer has a viscosity in the range from about 40 to about 2250 centipoises at about 25° C.

3. The process of claim 1 wherein the bottom impure liquid layer is derived from a filter grade WPPA containing about 30 percent $P_2O_5$; wherein the moles of ammonia per mole of $P_2O_5$ is maintained in the range from about 0.3 to about 0.4, and wherein the resulting bottom liquid layer has a viscosity in the range of about 300 centipoises at about 25° C.

4. The process of claim 1 wherein the bottom impure liquid layer is derived from about a 30-percent $P_2O_5$ wet-process phosphoric acid containing about 0.2 mole of ammonia per mole of $P_2O_5$ and has a viscosity of less than about 3000 centipoises at 25° C.

5. The process of claim 1 wherein the bottom impure liquid layer is derived from a 54-percent $P_2O_5$ wet-process phosphoric acid containing about 0.6 mole of ammonia per mole of $P_2O_5$ and has a viscosity of about 2500 centipoises at 25° C.

6. The process of claim 1 wherein the viscosity at 25° C. of the bottom impure liquid layer is in the range of about 40 to about 2500 centipoises.

7. The process of claim 1 wherein the mixing period ranges from about 10 minutes to about 60 minutes.

8. The process of claim 1 wherein the temperature during the mixing period ranges from about 25° C. to about 60° C.

* * * * *